(12) United States Patent
Berglow

(10) Patent No.: US 7,374,374 B2
(45) Date of Patent: May 20, 2008

(54) TOOL FOR CHIP REMOVAL

(75) Inventor: Karl-Erik Berglow, Fagersta (SE)

(73) Assignee: Seco Tools AB, Fagersta (SE)

( * ) Notice: Subject to any disclaimer, the term of this patent is extended or adjusted under 35 U.S.C. 154(b) by 55 days.

(21) Appl. No.: 11/308,210

(22) Filed: Mar. 13, 2006

(65) Prior Publication Data

US 2007/0053755 A1    Mar. 8, 2007

Related U.S. Application Data

(63) Continuation of application No. PCT/SE2004/001274, filed on Sep. 6, 2004.

(30) Foreign Application Priority Data

Sep. 12, 2003   (SE)   ................................... 0302452

(51) Int. Cl.
*B23B 51/06*   (2006.01)
*B23C 5/28*   (2006.01)

(52) U.S. Cl. .......................................... 408/59; 407/11

(58) Field of Classification Search .................. 408/57, 408/59; 407/11; *B23B 51/06; B23C 5/28*
See application file for complete search history.

(56) References Cited

U.S. PATENT DOCUMENTS

| | | | | |
|---|---|---|---|---|
| 1,104,989 A | * | 7/1914 | Hanson | 408/59 |
| 2,276,532 A | * | 3/1942 | Welty | 408/224 |
| 3,543,613 A | * | 12/1970 | Obloy | 408/57 |
| 3,591,302 A | * | 7/1971 | Andreasson | 408/59 |
| 3,811,163 A | * | 5/1974 | Frederick et al. | 407/11 |
| 4,190,125 A | | 2/1980 | Emmerich et al. | |
| 5,234,293 A | * | 8/1993 | Mena | 408/57 |
| 5,452,971 A | * | 9/1995 | Nevills | 408/230 |
| 5,851,094 A | * | 12/1998 | Strand et al. | 409/234 |
| 5,993,120 A | * | 11/1999 | Giessler | 408/59 |
| 6,210,083 B1 | * | 4/2001 | Kammermeier et al. | 408/1 R |
| 7,226,254 B2 | * | 6/2007 | Friedrichs | 408/226 |

FOREIGN PATENT DOCUMENTS

| | | | |
|---|---|---|---|
| DE | 2649323 A1 | * | 7/1977 |
| DE | 3636798 A1 | * | 4/1988 |
| DE | 29618293 U1 | | 2/1997 |
| DE | 19632974 A1 | | 2/1998 |
| DE | 19820148 A1 | | 11/1999 |
| EP | 1224994 A2 | | 7/2002 |
| SU | 965628 A1 | | 10/1982 |
| SU | 1335382 A1 | * | 9/1987 |
| WO | WO0056490 A1 | * | 9/2000 |

OTHER PUBLICATIONS

International Search Report from corresponding International Application No. PCT/SE2004/001274.

* cited by examiner

*Primary Examiner*—Daniel W Howell
(74) *Attorney, Agent, or Firm*—WRB-IP LLP

(57) ABSTRACT

A tool for chip removing machining has an axial channel, the tool being a one-piece unit, the tool having a first end and a second end, the first end comprising cutting edges, the second end forming an end of a shank of the tool. The second end of the shank is cylindrical and the axial channel has a diminishing cross-sectional area in a direction from the second end towards the first end.

17 Claims, 1 Drawing Sheet

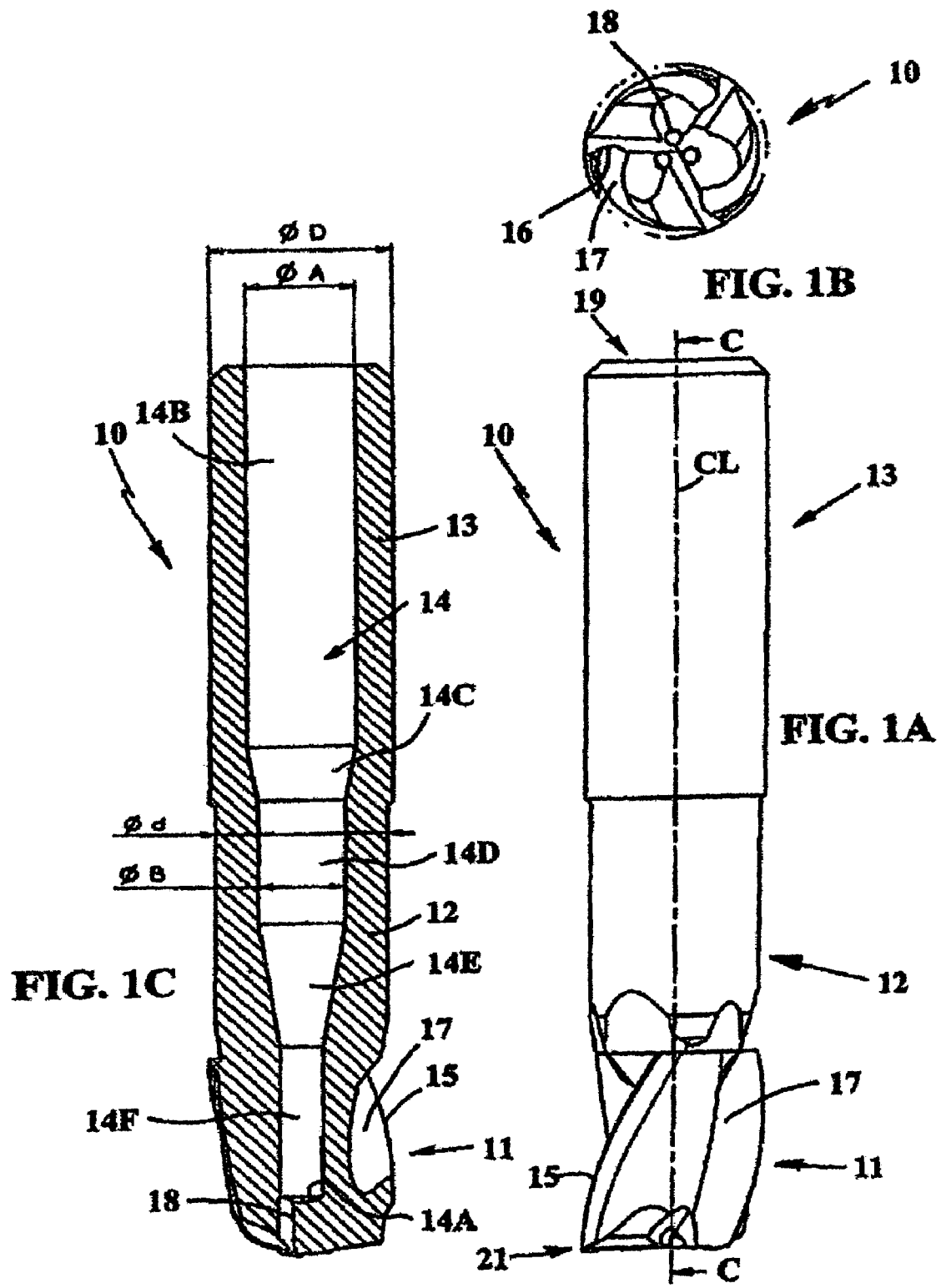

TOOL FOR CHIP REMOVAL

BACKGROUND AND SUMMARY

The present application is a continuation of International Application No. PCT/SE2004/001274, filed Sep. 6, 2004, which claims priority to SE 0302452-8, filed Sep. 12, 2003, both of which are incorporated by reference.

The present invention relates to a tool for rotary chip removal machining.

It is previously known through U.S. Pat. No. 4,850,759 to provide a solution to the problem of providing milling and drilling tools in small dimensions with interchangeable cutting inserts. However in some cases at high rotational speeds, the known tool tends to vibrate and create unwanted patterns or vibrational marks in the work piece. Furthermore, the known tools are relatively expensive.

It is desirable to provide a tool that is economically favorable.

It is desirable to provide a tool, which allows good cooling.

It is desirable to provide a tool in which the flushing channel allows for good flow of flushing medium.

It is desirable to provide a tool that allows regrinding.

It is desirable to provide a tool in which the flushing channel allows for great freedom in cutting head geometry.

According to an aspect of the present invention, a tool for chip removing machining, the tool has an axial channel, the tool being a one-piece unit, the tool having a first end and a second end, the first end comprising cutting edges, the second end forming an end of a shank of the tool, wherein the second end of the shank is cylindrical and the axial channel has a diminishing cross-sectional area in a direction from the second end towards the first end.

BRIEF DESCRIPTION OF THE DRAWINGS

Below embodiments of the present invention will be described with reference to the enclosed drawings, wherein FIG. 1A shows tool according to the present invention in a side view, FIG. 1B shows a top view of the tool in FIG. 1A and FIG. 1C shows a cross-section according to the line C-C in FIG. 1A.

DETAILED DESCRIPTION

The embodiment of a tool 10 according to the present invention shown in FIGS. 1A-1C comprises a one-piece unit having a cutting head 11, a waist 12 and a fastening means or shank 13. The tool comprises a through-going axial or central channel 14. The channel is adapted for transferring flush medium to cutting edges 15, 16 of the cutting head 11. The channel 14 is configured also to diminish the mass of cemented carbide in the tool 10.

The cutting edges are provided at the end 21 of the tool 10 facing away from the shank 13, which are given different design depending on the area of application. A preferred shape of the forward end of the tool 10 is shown in detail in FIG. 1B. The tool 10 is performed in hard material, preferably cemented carbide, and comprises three helical first cutting edges 15 and three second cutting edges 16, all integral with the tool. The number of major cutting edges may alternatively be one, two or four to six. The first cutting edges 15 preferably lie in a common, imaginary cylinder, which is concentric with the axis CL of rotation of the tool. Each chip flute 17 is concavely formed and extends from a connected second cutting edge 16 at the free end 21 of the tool. The second cutting edge 16 has a radial extension inwards from the imaginary cylinder, whereof one cutting edge, substantially connects to the axis of rotation CL of the tool such that the tool can be able to drill downwards into the work piece. Each pair of cutting edges 15, 16 is fed with flush medium via a hole 18. The three holes 18 are arranged in a ring suitably symmetrically about the axis CL of rotation of the tool. The holes 18 connect to the central channel 14, which terminates in the area of the other free end 19 of the tool. The channel 14 is of circular cross-section forming several circular spaces of different diameters. At least the second cutting edge 16 intersects an imaginary extension of the circular axial channel 14, which means that there is provided perforated cemented carbide material axially in front of the channel 14. The holes 18 intersect the central channel 14. The circular central channel 14 terminates axially distant from the first free end 21 of the tool 10. The forward end 14A of the axial channel 14 comprises material at least partly blocking the axial channel.

The outer diameter of the cylindrical shank 13 is designated by (D. The shank encloses a first internal space 14B, preferably cylindrical, having a largest diameter (A. The diameter (A is 25 to 80% of the outer diameter (D. The first internal space 14B connects to a first conical transition space 14C joining a second internal space 14D. The outer diameter of the cylindrical waist 12 is designated by (d. The waist encloses the second internal space 14D, preferably cylindrical, having a largest diameter (B. The diameter (B is 25 to 80% of the outer diameter (d. The second internal space 14D connects to a second conical transition space 14E joining a third internal space 14F. The diameter of the third internal space 14F is smaller than the diameters (A and (B. The axial length of the second conical transition space 14E is larger than the axial length of the first conical transition space 14E. The third internal space 14F ends at the wall 14A that is perforated by the holes 18 at three positions. The holes 18 are preferably parallel with the axis CL. Thus, the channel 14 comprises three cylindrical spaces 14B, 14D, 14F interconnected by conical steps 14C, 14E. Thereby, a through the tool going channel 14 for flush medium has been formed via the portions 14B-14F and 18. The largest wall thickness of the tool between the envelope surface of the tool and the axial channel 14 is situated closer to the first end 21 than to the second end 19 to minimize deflection. The ratio of the greatest axial length of the tool to the outer diameter (D is for example about 4 to 6.

In addition shall be pointed out that the described embodiment relates to milling or drilling tool arrangements, i.e. tool arrangements which rotate about their longitudinal center axes. Milling cutters with small diameters are expected to be the first area of application for the present invention but also drilling tools fall within the scope of the invention.

Thus, the present invention provides numerous advantages relative to prior art. The tool is economically favorable since it saves cemented carbide. The tool allows good cooling and flow of flushing medium due to the geometry of the axial channel. The tool allows regrinding. The wall thickness is largest at the waist 12 adjacent the cutting head where the bending moment is greatest. This also allows for great freedom when choosing cutting head geometry.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention is in no way limited to the above-described embodiments but may be freely varied within the limits of the subsequent claims.

What is claimed is:

1. A tool for chip removing machining, the tool having an axial channel, the tool being a one-piece unit, the tool having a first end and a second end and a waist area between the first end and the second end, the first end comprising cutting edges, the second end forming an end of a shank of the tool, wherein the second end of the shank is cylindrical and the axial channel has a diminishing cross-sectional area in a direction from the second end towards the first end, and a largest wall thickness of the tool between an envelope surface of the tool and the axial channel is situated along the waist adjacent the cutting edges.

2. The tool according to claim 1, wherein the axial channel comprises a plurality of spaces of diminishing cross-sectional area in a direction from the second end towards the first end.

3. The tool according to claim 2, wherein the channel comprises steps of successively diminishing cross-sectional area.

4. The tool according to claim 2, wherein the largest wall thickness of the tool between an envelope surface of the tool and the axial channel is situated closer to the first end than to the second end.

5. The tool according to claim 4, wherein the channel comprises steps of successively diminishing cross-sectional area.

6. The tool according to claim 5, wherein the channel is adapted for transferring flush medium to one or more cutting edges of the tool and one cutting edge connects substantially to an axis of rotation of the tool.

7. The tool according to claim 6, wherein at least one cutting edge intersects an imaginary extension of the axial channel.

8. The tool according to claim 7, wherein the channel comprises three cylindrical spaces interconnected by conical steps.

9. The tool according to claim 8, wherein the tool is provided with three cutting edge pairs, which are integral with the tool, the tool having three chip flutes, wherein each cutting edge pair is adapted to be fed with flush medium via a hole connected to the axial channel, thereby providing three holes terminating at a first free end of the tool and the holes intersect the central channel.

10. The tool according to claim 9, wherein the shank encloses a first internal space having a largest diameter, wherein the diameter is 25 to 80% of an outer diameter of the shank.

11. The tool according to claim 1, wherein the largest wall thickness of the tool between an envelope surface of the tool and the axial channel is situated closer to the first end than to the second end.

12. The tool according to claim 1, wherein the channel comprises steps of successively diminishing cross-sectional area.

13. The tool according to claim 1, wherein the channel is adapted for transferring flush medium to one or more cutting edges of the tool and one cutting edge connects substantially to an axis of rotation of the tool.

14. The tool according to claim 1, wherein at least one cutting edge intersects an imaginary extension of the axial channel.

15. The tool according to claim 1, wherein the channel comprises three cylindrical spaces interconnected by conical steps.

16. The tool according to claim 1, wherein the tool is provided with three cutting edge pairs, which are integral with the tool, the tool having three chip flutes, wherein each cutting edge pair is adapted to be fed with flush medium via a hole connected to the axial channel, thereby providing three holes terminating at a first free end of the tool and the holes intersect the central channel.

17. The tool according to claim 1, wherein the shank encloses a first internal space having a largest diameter, wherein the diameter is 25 to 80% of an outer diameter of the shank.

* * * * *